(12) United States Patent
Hengstler et al.

(10) Patent No.: US 7,379,049 B2
(45) Date of Patent: May 27, 2008

(54) APPARATUS FOR CONTROLLING THE POSITION OF A SCREEN POINTER BASED ON PROJECTION DATA

(75) Inventors: Stephan Hengstler, Campbell, CA (US); Todd S. Sachs, Palo Alto, CA (US)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 575 days.

(21) Appl. No.: 11/010,666

(22) Filed: Dec. 13, 2004

(65) Prior Publication Data

US 2006/0125793 A1  Jun. 15, 2006

(51) Int. Cl.
*G09G 3/38* (2006.01)

(52) U.S. Cl. .................. 345/158; 345/157; 345/166; 345/163

(58) Field of Classification Search ........ 345/156–158, 345/173, 177, 166, 163, 169, 629, 605, 419, 345/473, 179, 8; 250/208.2; 382/312, 321; 358/474, 1.13; 348/53
See application file for complete search history.

(56) References Cited

U.S. PATENT DOCUMENTS

| | | | |
|---|---|---|---|
| 4,794,384 A | 12/1988 | Jackson | |
| 5,557,097 A * | 9/1996 | Ortyn et al. ............. | 250/201.3 |
| 5,578,813 A | 11/1996 | Allen et al. | |
| 5,644,139 A | 7/1997 | Allen et al. | |
| 5,757,360 A * | 5/1998 | Nitta et al. ................ | 345/156 |
| 5,764,280 A * | 6/1998 | Bloom et al. ................ | 348/53 |
| 5,786,804 A | 7/1998 | Gordon | |
| 5,801,849 A * | 9/1998 | Soloveychik et al. ....... | 358/474 |
| 6,104,497 A * | 8/2000 | Cohen et al. .............. | 358/1.13 |
| 6,195,475 B1 * | 2/2001 | Beausoleil et al. ......... | 382/312 |
| 6,281,882 B1 | 8/2001 | Gordon et al. | |
| 6,587,227 B1 * | 7/2003 | Fullerton ..................... | 358/474 |
| 6,603,580 B1 * | 8/2003 | Taillie ........................ | 358/474 |
| 7,215,447 B2 * | 5/2007 | Liu ............................ | 358/474 |
| 7,268,923 B2 * | 9/2007 | Schroath et al. ............ | 358/474 |
| 2002/0180880 A1 | 12/2002 | Bean et al. | |
| 2002/0190953 A1 | 12/2002 | Gordon | |
| 2003/0001078 A1 | 1/2003 | Baharav et al. | |
| 2003/0091244 A1 * | 5/2003 | Schnee et al. .............. | 382/321 |
| 2003/0103037 A1 | 6/2003 | Rotzoll | |
| 2004/0051798 A1 | 3/2004 | Kakarala et al. | |
| 2004/0070565 A1 * | 4/2004 | Nayar et al. ................. | 345/156 |
| 2005/0168445 A1 * | 8/2005 | Piot et al. .................... | 345/163 |
| 2006/0028442 A1 * | 2/2006 | Bynum et al. .............. | 345/157 |

OTHER PUBLICATIONS

Orazio Svelto article entitled "Properties of Laser Beams", © 1998, 1989, 1982, 1976, pp. 9-10.
Bruce D. Lucas et al., article entitled "An Iterative Registration Technique with an Application to Stereo Vision", pp. 674-679, Aug. 24-28, 1981.
M. Brosnan et al., U.S. Appl. No. 10/805,814 appln entitled "Apparatus for Controlling the Position of a Screen Pointer with Low Sensitivity to Particle Contaimination", filed Mar. 22, 2004.

* cited by examiner

*Primary Examiner*—Prabodh Dharia

(57) ABSTRACT

A device such as an optical mouse includes a light source for illuminating an imaging surface, thereby generating reflected images. The device also includes an optical motion sensor for generating one-dimensional projection data based on the reflected images, filtering the projection data, and generating movement data based on the filtered projection data. The movement data is indicative of relative motion between the imaging surface and the device.

10 Claims, 4 Drawing Sheets

APPARATUS FOR CONTROLLING THE POSITION OF A SCREEN POINTER BASED ON PROJECTION DATA

BACKGROUND

The use of a hand operated pointing device with a computer and its display has become almost universal. One form of the various types of pointing devices is the conventional (mechanical) mouse, used in conjunction with a cooperating mouse pad. Mechanical mice typically include a rubber-surfaced steel ball that rolls over the mouse pad as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a ΔX and a ΔY the displayed position of a pointer (cursor) in accordance with movement of the mouse.

In addition to mechanical types of pointing devices, such as a conventional mechanical mouse, optical pointing devices have also been developed. In one form of an optical pointing device, rather than using a moving mechanical element like a ball, relative movement between an imaging surface, such as a finger or a desktop, and photo detectors within the optical pointing device, is optically sensed and converted into movement information.

In some optical pointing devices, motion is determined from two-dimensional (2-D) cross-correlations of image sequences. The two-dimensional nature of the data results in significant computational complexity, and a large memory is typically used to store the image arrays that are used for correlation. The two-dimensional nature of the data constrains the maximum frame rate at which images can be acquired and processed. As a result, the pixel pitch of the image sensor is lower bounded to enable navigation up to some maximum velocity.

SUMMARY

One form of the present invention provides an apparatus for controlling the position of a screen pointer. The apparatus includes a light source for illuminating an imaging surface, thereby generating reflected images. The apparatus includes an optical motion sensor for generating one-dimensional projection data based on the reflected images, filtering the projection data, and generating movement data based on the filtered projection data, the movement data indicative of relative motion between the imaging surface and the apparatus.

BRIEF DESCRIPTION OF THE DRAWINGS

FIG. 5 is a diagram illustrating another embodiment of the photodetector array shown in block form in FIG. 2.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
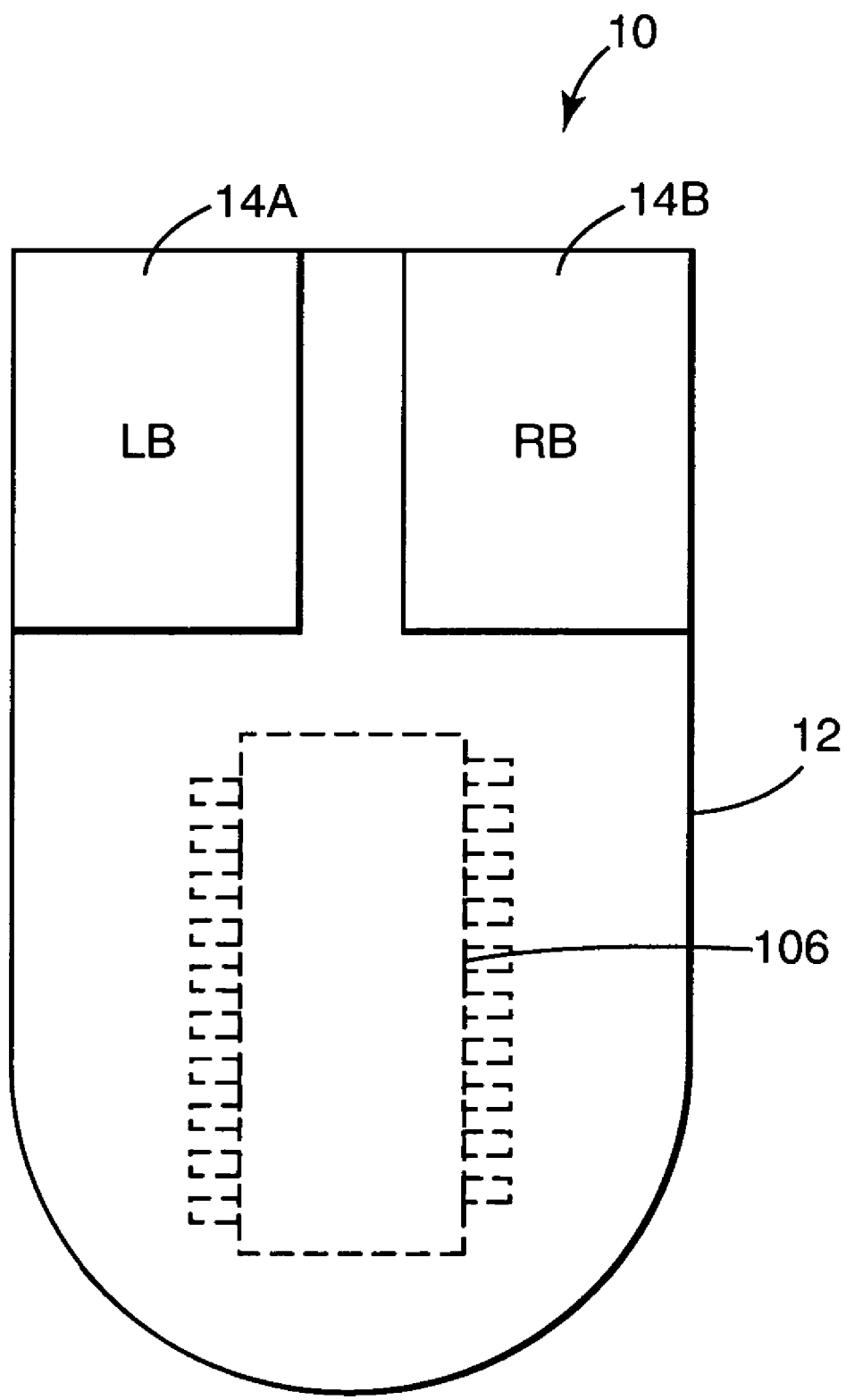
FIG. 1 is a top view of an optical pointing device according to one embodiment of the present invention.

FIG. 1 is a top view of an optical pointing device 10 according to one embodiment of the present invention. In the illustrated embodiment, optical pointing device 10 is an optical mouse. Pointing device 10 includes plastic case 12, left button (LB) 14A, right button (RB) 14B, and optical navigation sensor integrated circuit (IC) 106 (also referred to as optical motion sensor 106). Optical motion sensor 106 is covered by plastic case 12, and is therefore shown with dashed lines in FIG. 1. Pointing device 10 according to one form of the invention is described in further detail below with reference to FIG. 2.

Figure 2:
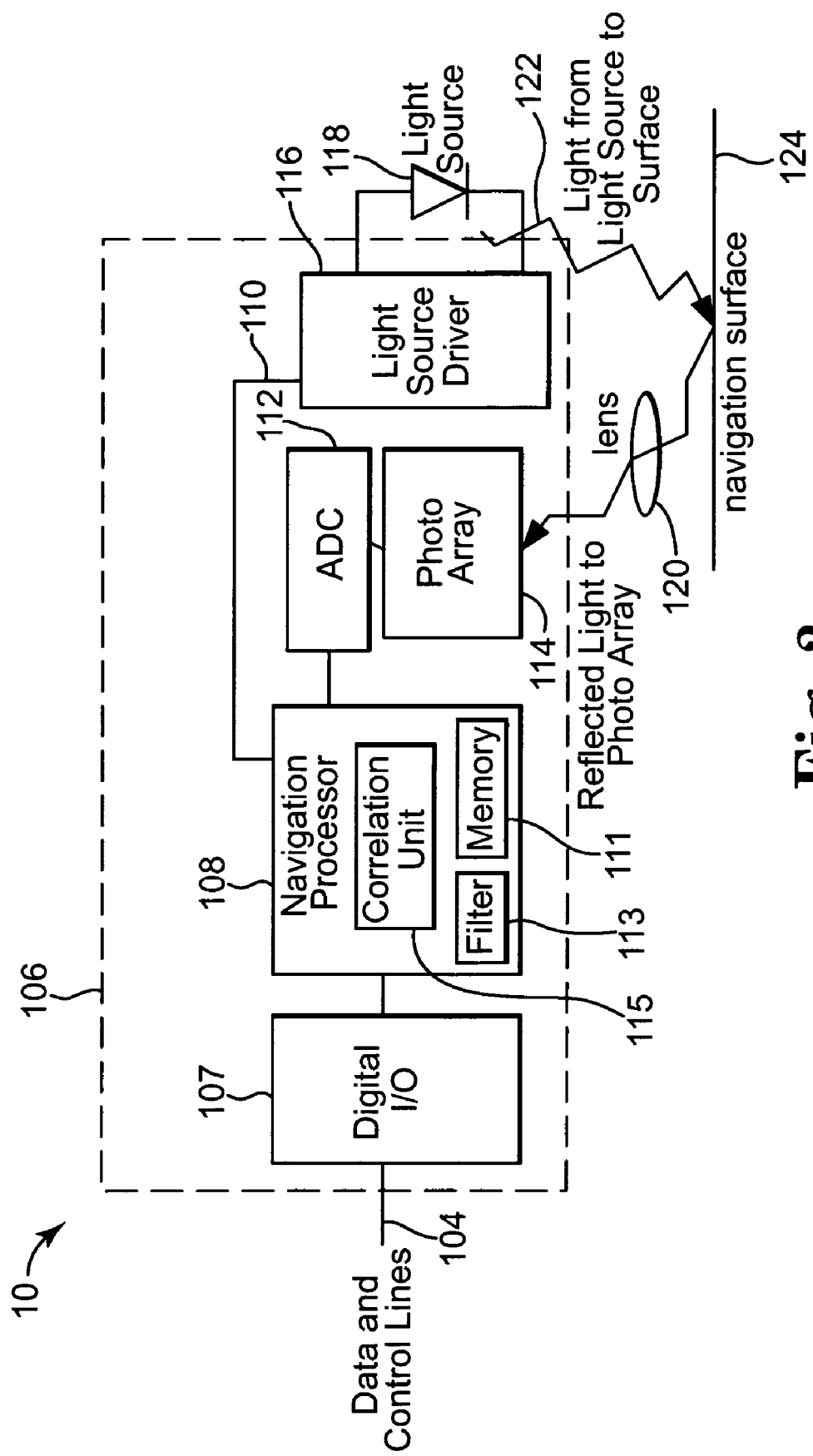
FIG. 2 is a block diagram illustrating major components of the optical pointing device shown in FIG. 1 according to one embodiment of the present invention.

FIG. 2 is a block diagram illustrating major components of the optical pointing device 10 shown in FIG. 1 according to one embodiment of the present invention. Optical pointing device 10 includes optical motion sensor 106, light source 118, and lens 120. In another embodiment, optical pointing device 10 includes both a lens 120 and an aperture (not shown). In yet another embodiment, optical pointing device 10 includes an aperture, but not a lens 120. Optical motion sensor 106 includes digital input/output (I/O) circuitry 107, navigation processor 108, analog to digital converter (ADC) 112, photodetector array (photo array) 114, and light source driver circuit 116. Navigation processor 108 includes memory 111, filter 113, and correlation unit 115. In one embodiment, optical pointing device 10 is an optical mouse for a desktop personal computer, workstation, portable computer, or other device. In another embodiment, optical pointing device 10 is configured as an optical fingerprint sensing pointing device, or other pointing device.

In operation, according to one embodiment, light source 118 emits light 122 onto navigation surface 124, which is a desktop or other suitable imaging surface, and reflected images are generated. In one embodiment, light source 118 is a coherent light source or an at least partially coherent light source. In one embodiment, light source 118 is a laser. In another embodiment, light source 118 is a light emitting diode (LED). Light source 118 is controlled by driver circuit 116, which is controlled by navigation processor 108 via control line 110. In one embodiment, control line 110 is used by navigation processor 108 to cause driver circuit 116 to be powered on and off, and correspondingly cause light source 118 to be powered on and off.

Reflected light from surface 124 is directed by lens 120 onto photodetector array 114. Each photodetector in photodetector array 114 provides a signal that varies in magnitude based upon the intensity of light incident on the photodetector. The signals from photodetector array 114 are output to analog to digital converter 112, which converts the signals into digital values of a suitable resolution (e.g., eight bits). The digital values represent a digital image or digital representation of the portion of the desktop or other navigation surface or imaging surface under optical pointing device 10. The digital values generated by analog to digital converter 112 are output to navigation processor 108. The digital values received by navigation processor 108 are stored as frames within memory 111. In one form of the invention, the digital values are filtered by filter 113 before being stored in memory 111.

The overall size of photodetector array 114 according to one embodiment is preferably large enough to receive an image having several features. Images of such spatial features produce translated patterns of pixel information as optical pointing device 10 moves over navigation surface 124. The number of photodetectors in array 114 and the frame rate at which their contents are captured and digitized cooperate to influence how fast optical pointing device 10 can be moved across a surface and still be tracked. Tracking is accomplished by navigation processor 108 by comparing a newly captured sample frame with a previously captured reference frame to ascertain the direction and amount of movement.

In previous optical pointing devices, motion information has been determined based on a cross-correlation of sequential two-dimensional frames. In some implementations, the cross-correlation involves multiplying the reference frame and the sample frame on a pixel by pixel basis, and accumulating these products, to generate movement information ($\Delta X$ and $\Delta Y$).

In one form of the invention, rather than performing a correlation of successive two-dimensional digital images to determine movement information as described above, navigation processor 108 is configured to perform movement computations or displacement calculations based on one-dimensional "projections." A projection according to one embodiment of the present invention is defined to include a one-dimensional array of pixel values, which is generated in one form of the invention by summing pixel values from rows or columns of photodetector array 114. In one embodiment, the projection data is filtered by filter 113 before being used to generate the movement data. The two-dimensional movement data ($\Delta X$ and $\Delta Y$) generated by navigation processor 108 from the projection data is output to a host device by digital input/output circuitry 107 on data and control lines 104. Optical pointing device 10 is also configured to receive data and control signals from a host device via data and control lines 104. Generation of projection data and movement data according to embodiments of the present invention is described in further detail below with reference to FIGS. 3-5.

It will be understood by a person of ordinary skill in the art that functions performed by optical motion sensor 106 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Figure 3:
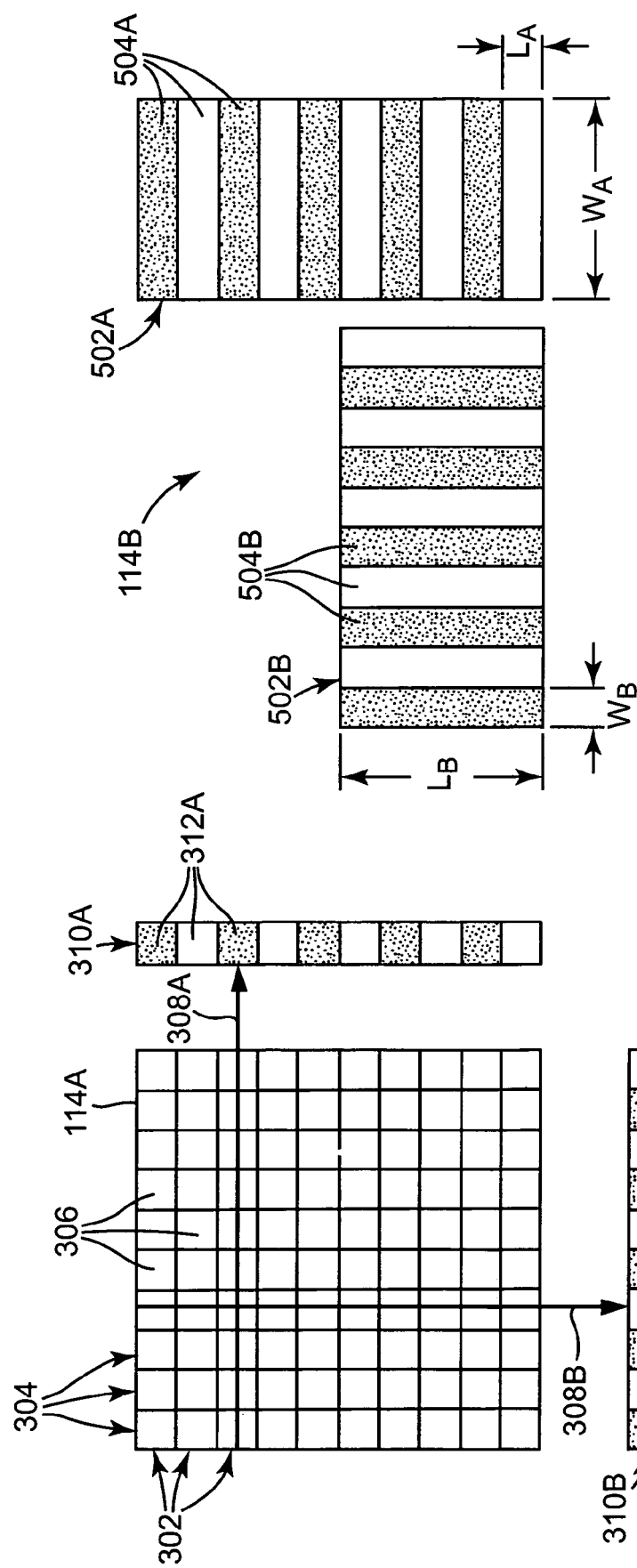
FIG. 3 is a diagram illustrating one embodiment of the photodetector array shown in block form in FIG. 2.

FIG. 3 is a diagram illustrating one embodiment 114A of the photodetector array 114 shown in block form in FIG. 2. As shown in FIG. 3, photodetector array 114A is a two-dimensional array of photodetectors or pixels 306. The photodetectors 306 are organized into a plurality of rows 302 and a plurality of columns 304. FIG. 3 also shows projections 310A and 310B. Projection 310A is a horizontal projection that includes a one-dimensional array of row sums, which are represented by array elements 312A. Each array element 312A in projection 310A corresponds to one of the rows 302 of photodetectors 306 in photodetector array 114A. In one embodiment, the value of each array element 312A is determined by navigation processor 108 by summing the values of the photodetectors 306 (after the values are digitized by analog to digital converter 112) in the row 302 corresponding to that array element 312A. For example, as shown by arrow 308A, the value of the third array element 312A from the top of array 310A is determined by summing the values of the photodetectors 306 in the third row 302 from the top of photodetector array 114A. In another embodiment, the value of each array element 312A is determined by summing the values of the photodetectors 306 in the row 302 corresponding to that array element 312A using analog circuitry, and then digitizing the sums with analog to digital converter 112.

Projection 310B is a vertical projection that includes a one-dimensional array of column sums, which are represented by array elements 312B. Each array element 312B in projection 310B corresponds to one of the columns 304 of photodetectors 306 in photodetector array 114A. In one embodiment, the value of each array element 312B is determined by navigation processor 108 by summing the values of the photodetectors 306 (after the values are digitized by analog to digital converter 112) in the column 304 corresponding to that array element 312B. For example, as shown by arrow 308B, the value of the fourth array element 312B from the left of array 310B is determined by summing the values of the photodetectors 306 in the fourth column 304 from the left of photodetector array 114A. In another embodiment, the value of each array element 312B is determined by summing the values of the photodetectors 306 in the column 304 corresponding to that array element 312B using analog circuitry, and then digitizing the sums with analog to digital converter 112.

In the embodiment illustrated in FIG. 3, the projections 310A and 310B are taken along orthogonal axes. In another embodiment of the present invention, projections are taken along axes that are not orthogonal, or are taken along more than two axes. In one form of the invention, at least three projections are taken along at least three axes.

Figure 4:
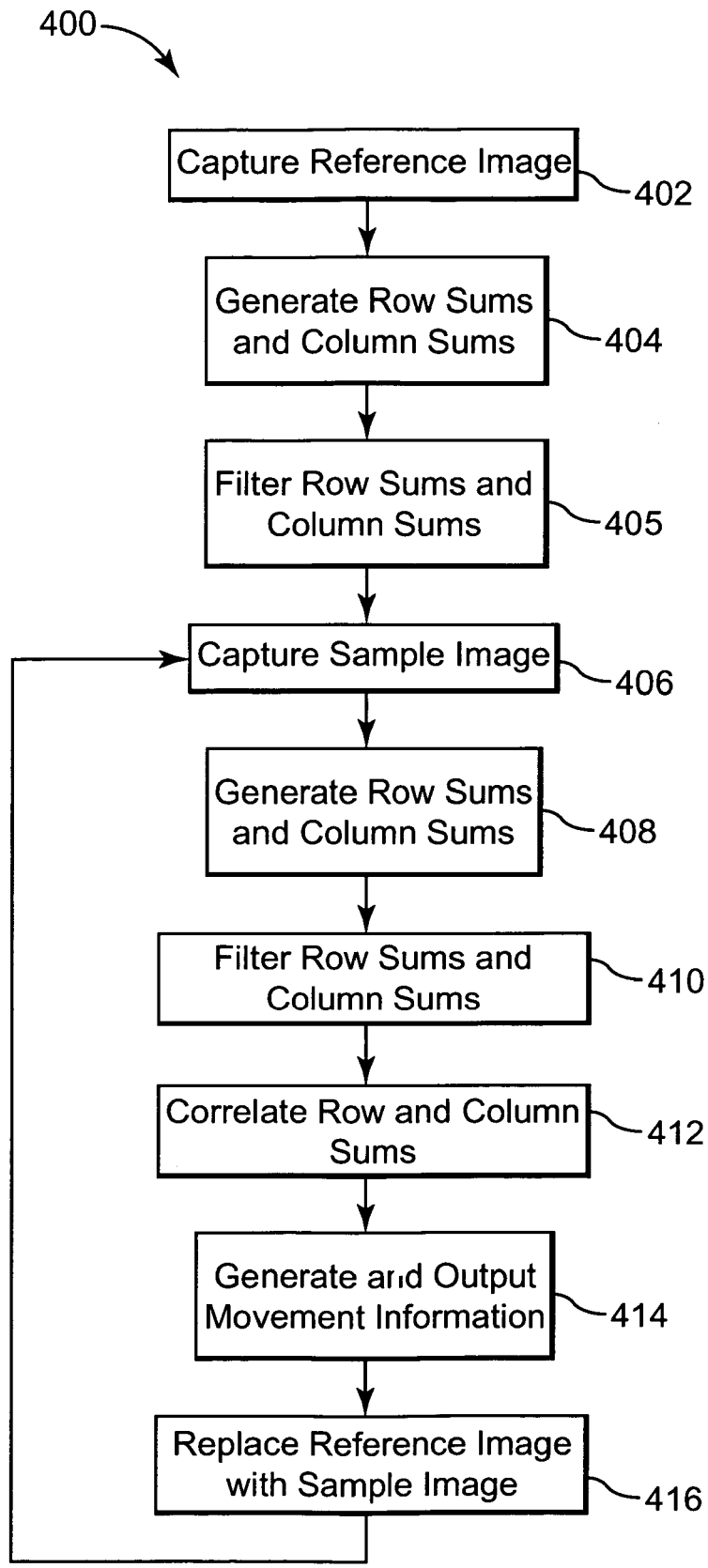
FIG. 4 is a flow diagram illustrating a method for generating movement data with the optical pointing device shown in FIGS. 1 and 2, using cross-correlation of one-dimensional projection data according to one embodiment of the present invention.

FIG. 4 is a flow diagram illustrating a method 400 for generating movement data with the optical pointing device 10 shown in FIGS. 1 and 2, using cross-correlation of one-dimensional projection arrays according to one embodiment of the present invention. At 402, a reference image is acquired by photo detector array 114A. The acquired image is converted into a digital image by analog to digital converter 112, and the reference digital image is output to navigation processor 108. At 404, navigation processor 108 sums the pixel values in each row of the reference digital image, thereby generating a plurality of row sums, and also sums the pixel values in each column of the reference digital image, thereby generating a plurality of column sums.

At 405, navigation processor 108 filters the row sums and column sums generated at 404, using filter 113 (FIG. 2). In one embodiment, the filtering at 405 removes unwanted spatial frequency components from the projection data. In one embodiment, filter 113 is implemented with two one-dimensional bandpass finite impulse response (FIR) filters that remove low frequency components (e.g., DC components, or components close to zero frequency), and higher frequency components (e.g., components at or near the Nyquist frequency). The low frequency components are removed because they can cause false correlation peaks to occur at around zero frequency, and the correlation peaks that are actually caused by motion are typically smaller when there is a large DC component. The frequency components at or near the Nyquist frequency are removed to mitigate aliasing effects.

At 406, a sample image is acquired by photo detector array 114. The acquired image is converted into a digital image by analog to digital converter 112, and the sample digital image is output to navigation processor 108. At 408, navigation processor 108 sums the pixel values in each row of the sample digital image, thereby generating a plurality of row sums, and also sums the pixel values in each column of the sample digital image, thereby generating a plurality of column sums.

At 410, navigation processor 108 filters the row sums and column sums generated at 408 using filter 113 (FIG. 2) in the same manner as described above with respect to reference number 405. By filtering the projection data, which are one-dimensional arrays, one-dimensional filtering can performed at 405 and 410, which is less complex than two-dimensional filtering. In another embodiment of the present invention, rather than performing filtering on the projection data, navigation processor 108 performs the filtering with filter 113 on the two-dimensional reference digital image (acquired at 402) and the sample digital image (acquired at 406), before the projection data is generated. In this embodiment, filter 113 is implemented with one two-dimensional bandpass filter. In one embodiment, the filter 113 is a two-dimensional bandpass FIR filter.

At 412, navigation processor 108 correlates the plurality of row sums of the reference digital image with the plurality of rows sums of the sample digital image; correlates the plurality of column sums of the reference digital image with the plurality of column sums of the sample digital image; and determines a magnitude and direction of movement based on the correlations. At 414, navigation processor 108 generates two-dimensional movement information based on the correlations performed at 412, and outputs the movement information to a host device via digital input/output circuitry 107. At 416, the reference digital image (acquired at 402) is replaced by the sample digital image (acquired at 406), which then becomes the reference digital image for the next iteration of method-400. Another sample image is then acquired at 406, and the method 400 is repeated from 406. In another embodiment, rather than replacing the reference image during each iteration of method 400, the frequency of replacement of the reference image depends on the velocity of motion.

FIG. 5 is a diagram illustrating another embodiment 114B of the photodetector array 114 shown in block form in FIG. 2. As shown in FIG. 5, photodetector array 114B includes a first one-dimensional array 502A of elongated photodetectors or pixels 504A, and a second one-dimensional array 502B of elongated photodetectors or pixels 504B. The photodetectors 504A of array 502A are organized into a single column, and the photodetectors 504B of array 502B are organized into a single row. In one embodiment, arrays 502A and 502B are spatially separate photosensitive structures. For the embodiment illustrated in FIG. 5, rather than generating projection data by calculating row and column sums as described above with respect to FIGS. 3 and 4, the projection data is generated directly by the elongated photodetectors 504A and 504B.

As shown in FIG. 5, the photodetectors 504A in array 502A each have a length, $L_A$, and a width, $W_A$. In one form of the invention, the width, $W_A$, of each photodetector 504A is substantially larger than the length, $L_A$, of the photodetector 504A. In one embodiment, the photodetectors 504A in array 502A have a width, $W_A$, to length, $L_A$, ratio (aspect ratio) of at least five to one (5:1). In one form of the invention, the aspect ratio of each of the photodetectors 504A in array 502A is in the range of 5:1 to 20:1. In one embodiment, array 502A includes twenty photodetectors 504A with a pitch in the range of five to ten micrometers.

As shown in FIG. 5, the photodetectors 504B in array 502B each have a length, $L_B$, and a width, $W_B$. In one form of the invention, the length, $L_B$, of each photodetector 504B is substantially larger than the width, $W_B$, of the photodetector 504B. In one embodiment, the photodetectors 504B in array 502B have a length, $L_B$, to width, $W_B$, ratio (aspect ratio) of at least five to one (5:1). In one form of the invention, the aspect ratio of each of the photodetectors 504B in array 502B is in the range of 5:1 to 20:1. In one embodiment, array 502B includes twenty photodetectors 504B with a pitch in the range of five to ten micrometers. In one embodiment, photodetector array 114B has an overall area of about 0.03 millimeters squared. In contrast, the two-dimensional photodetector arrays used in conventional optical pointing devices typically have an overall area of about 1.0 millimeters squared.

Array 502A generates horizontal projection data that is similar to the data in projection 310A (FIG. 3). As shown in FIG. 5, each of the photodetectors 504A in array 502A is longer in the horizontal direction than in the vertical direction, and has the same aspect ratio as a row (or part of a row) of square-shaped photodetectors, such as those shown in FIG. 3. Due to the increased detection area, each elongated photodetector 504A in array 502A generates a value that is similar to the value that would be obtained by summing the values from a row (or part of a row) of square-shaped photodetectors.

Array 502B generates vertical projection data that is similar to the data in projection 310B (FIG. 3). As shown in FIG. 5, each of the photodetectors 504B in array 502B is longer in the vertical direction than in the horizontal direction, and has the same aspect ratio as a column (or part of a column) of square-shaped photodetectors, such as those shown in FIG. 3. Due to the increased detection area, each elongated photodetector 504B in array 502B generates a value that is similar to the value that would be obtained by summing the values from a column (or part of a column) of square-shaped photodetectors.

Photodetectors 504A and 504B generate analog projection data, which is converted into digital projection data by analog to digital converter 112 (FIG. 2), and provided to navigation processor 108. In one embodiment, navigation processor 108 filters the received digital projection data in the same manner as described above with respect to FIG. 4, and performs a cross-correlation of the filtered projection data to determine movement information in the same manner as described above with respect to FIG. 4. By generating the horizontal and vertical projection data directly by the elongated photodetectors 504A and 504B, the number of analog to digital conversions performed by analog to digital converter 112 is reduced, and the number of computations performed by navigation processor 108 is reduced.

Embodiments of the present invention provide several advantages over previous optical pointing devices, such as those that rely on two-dimensional cross-correlation of successive images. A reduction in both computational complexity and memory size is attained in one form of the invention by performing a one-dimensional cross-correlation of projections along two axes. Because of the reduction in computational complexity and memory size according to one embodiment, image sensors with a smaller pixel pitch and smaller correlation memories can be used, resulting in a reduction in die size. The reduction in computational complexity and memory allocation also provides the ability to operate the image sensor at slower clock frequencies, and thereby reduce current consumption.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An apparatus for controlling the position of a screen pointer, the apparatus comprising:
    a light source for illuminating an imaging surface, thereby generating reflected images; and
    an optical motion sensor for generating one-dimensional projection data based on the reflected images, filtering the projection data, and generating movement data based on the filtered projection data, the movement data indicative of relative motion between the imaging surface and the apparatus;
    wherein the optical motion sensor comprises a first and a second one-dimensional array of elongated photodetectors for receiving the reflected images, and wherein the first one-dimensional array of elongated photodetectors generates analog projection data for a first axis, and the second one-dimensional array of elongated photodetectors generates analog projection data for a second axis;
    wherein the elongated photodetectors in the first array have a length to width ratio in the range of five to one (5:1) to twenty to one (20:1), and wherein the elongated photodetectors in the second array have a width to length ratio in the range of five to one (5:1) to twenty to one (20:1).

2. The apparatus of claim 1, wherein the light source is an at least partially coherent light source.

3. The apparatus of claim 2, wherein the light source is a laser light source.

4. The apparatus of claim 1, wherein the light source is a light-emitting diode (LED) source.

5. The apparatus of claim 1, wherein the optical motion sensor further comprises an analog to digital converter coupled to outputs of the elongated photodetectors in the first and the second arrays for generating digital projection data based on outputs of the elongated photodetectors, and wherein the movement data is generated based on a correlation of the digital projection data.

6. The apparatus of claim 1, wherein the elongated photodetectors in the first and the second arrays have a pitch in the range of about five to ten micrometers.

7. The apparatus of claim 1, wherein the optical motion sensor includes a bandpass filter configured to filter out DC frequency components in the projection data and frequency components in the projection data that are at or near a Nyquist frequency for the apparatus.

8. A method of generating movement data with an optical pointing device, the method comprising:
    illuminating an imaging surface with an at least partially coherent light source, thereby generating reflected images;
    generating one-dimensional arrays of projection data based on the reflected images;
    filtering the projection data;
    generating movement data based on a correlation of the filtered projection data;
    wherein the optical pointing device includes a first and a second one-dimensional array of elongated photodetectors for receiving the reflected images, the elongated photodetectors in the first array having a length to width ratio in the range of five to one (5:1) to twenty to one (20:1) and the elongated photodetectors in the second array having a width to length ratio in the range of five to one (5:1) to twenty to one (20:1), and wherein the step of generating one-dimensional arrays of projection data comprises:
    generating analog projection data for a first axis with the first one-dimensional array of elongated photodetectors; and
    generating analog projection data for a second axis with the second one-dimensional array of elongated photodetectors.

9. An optical motion sensor for generating movement data to control the position of a screen pointer, the sensor comprising:
    first and second one-dimensional arrays of elongated photodetectors configured to sense reflected images from an imaging surface produced by an at least partially coherent light source;
    an analog to digital converter for generating digital projection data based on outputs of the first and the second arrays; and
    a processor for generating movement data based on the digital projection data;
    wherein the elongated photodetectors in the first and the second arrays each have an aspect ratio in the range of five to one (5:1) to twenty to one (20:1).

10. The optical motion sensor of claim 9, wherein the first and the second arrays are orthogonal, and are spatially separate structures.

* * * * *